United States Patent [19]
Watanabe et al.

[11] Patent Number: 5,161,805
[45] Date of Patent: Nov. 10, 1992

[54] OIL RING ASSEMBLY

[75] Inventors: Haruhito Watanabe; Koichi Hasuike; Makoto Shiono; Hatsutaro Mizuno, all of Kashiwazaki, Japan

[73] Assignee: Kabushiki Kaisha Riken, Tokyo, Japan

[21] Appl. No.: 584,080

[22] Filed: Sep. 18, 1990

[30] Foreign Application Priority Data

Sep. 25, 1989 [JP] Japan .................................. 1-246372
Oct. 27, 1989 [JP] Japan .................................. 1-125162
Dec. 22, 1989 [JP] Japan .................................. 1-330998

[51] Int. Cl.⁵ .......................... F16J 9/06; F16J 9/20; F16J 9/24
[52] U.S. Cl. .................................. 277/139; 277/136; 277/141; 277/215
[58] Field of Search ............... 277/141, 139, 140, 138, 277/136, 137, 198, 199, 196, 215

[56] References Cited

U.S. PATENT DOCUMENTS 2,300,518 11/1942 Phillips .................................. 277/136
3,131,944 5/1964 Sanon .................................. 277/141 X
3,189,986 6/1965 Mayfield ............................ 277/139 X
3,295,857 1/1967 Lutz .................................... 277/136

FOREIGN PATENT DOCUMENTS 1096132 12/1960 Fed. Rep. of Germany ...... 277/140
78768 5/1989 Japan .
78769 5/1989 Japan .
54-161447 5/1989 Japan .

Primary Examiner—Allan N. Shoap
Attorney, Agent, or Firm—Finnegan, Henderson, Farabow, Garrett & Dunner

[57] ABSTRACT

In a method of manufacturing a side rail of a compound steel oil ring assembly in which a linear, strip-like wire material is passed between a plurality of pins and bent into an annular shape, a side of the side rail that will become the inner circumferential side thereof is brought into pressured contact with at least one pin formed to have a corrugated surface, thereby forming corrugations in the side of the side rail that will become the inner circumferential side thereof.

3 Claims, 7 Drawing Sheets

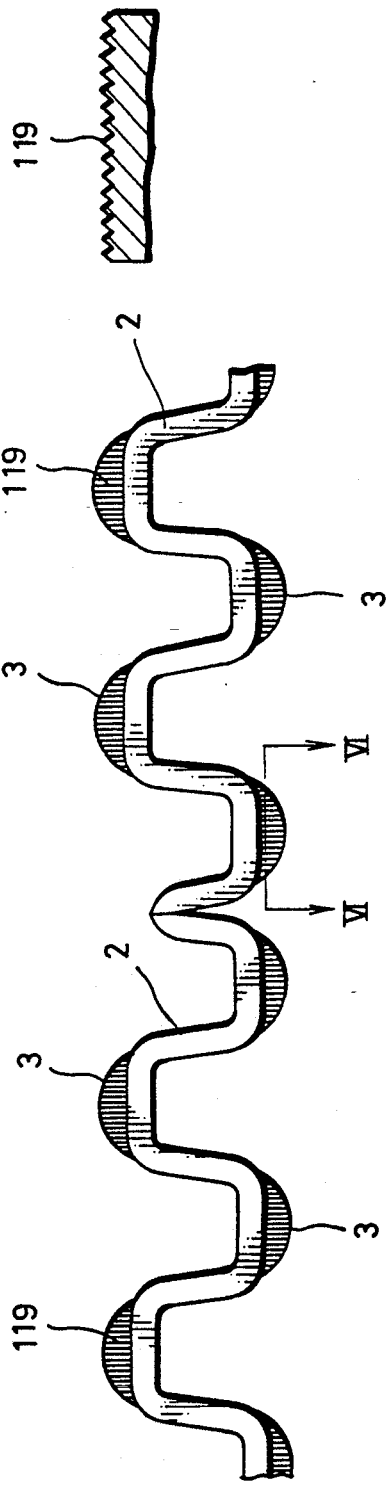
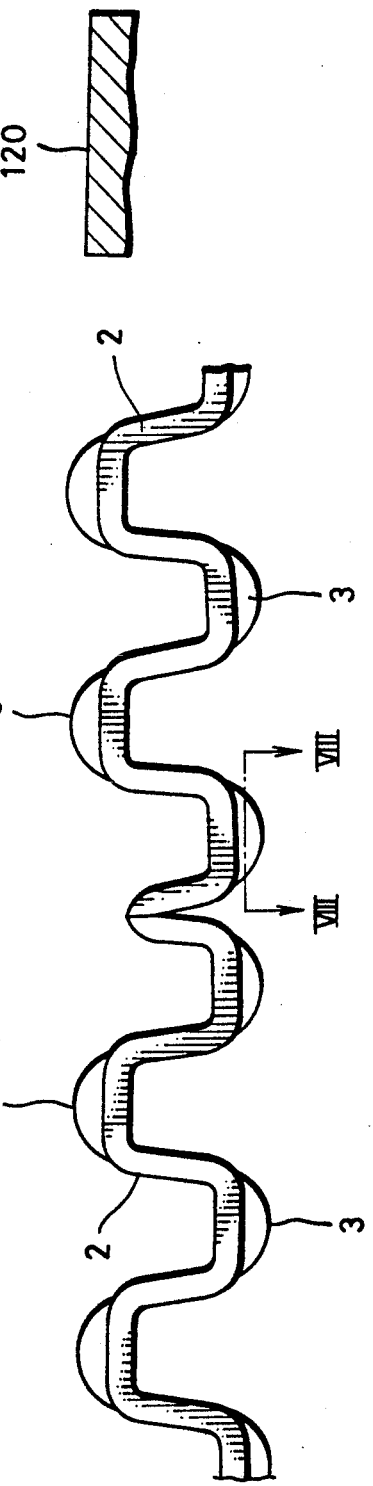

FIG. 15
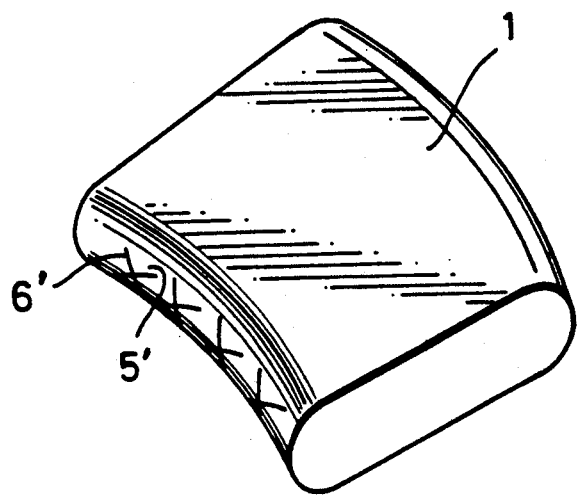
FIG. 16B    FIG. 16A
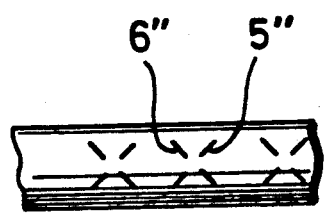 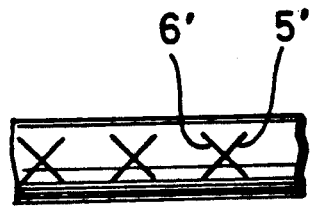

OIL RING ASSEMBLY

BACKGROUND OF THE INVENTION

This invention relates to a compound steel oil ring assembly and, more particularly, to improvements in a compound steel oil ring assembly having a spacer expander and side rails disposed above and below the spacer expander and brought into pressured contact with the inner wall of the cylinder of an internal combustion engine by the spacer expander.

In a conventional compound oil ring assembly, a situation arises in which the side rails disposed above and below the spacer expander undergo rotational motion in the circumferential direction during operation of an internal combustion engine, as a result of which the openings in the upper and lower side rails become aligned one above the other. In such case, a thick lubricating oil film formed by the gaps in the openings of the side rails is left on the cylinder wall in the form of streaks, and the oil is carried into the combustion chamber of the internal combustion engine. Such oil is consumed wastefully.

In order to solve this problem, the applicant has previously proposed a compound steel oil ring assembly having side rails the inner circumferential surfaces of which are formed to have fine corrugations extending in the axial direction (see Japanese Utility Model application Laid Open No. 1-78769).

However, a desirable method of forming the corrugations disclosed in the above-mentioned publication has not been developed, and manufacture continues to be performed by a manual operation.

SUMMARY OF THE INVENTION

To meet this need, the invention provides a method of manufacturing a side rail of a compound steel oil ring assembly in which a linear, strip-like wire material is passed between a plurality of pins and bent into an annular shape, characterized by bringing a side of the side rail that will become the inner circumferential side thereof into pressured contact with at least one pin formed to have a corrugated surface, thereby forming corrugations in the side of the side rail that will become the inner circumferential side thereof.

Thus, in accordance with the present invention, a fine, linear, strip-like wire material serving as the raw material of a side rail is passed between a plurality of pins and bent into an annular shape to manufacture a side rail. At such time, the side of the side rail which will eventually be the inner circumferential surface thereof that comes into contact with the projections of a spacer expander is brought into pressured contact with at least one pin whose surface has corrugations. In this way fine, longitudinally extending corrugations are transferred to the inner circumferential surface of the side rail.

In order to solve the aforementioned problem of wasteful consumption of lubricating oil, the present invention provides a method of machining, in a simple, reliable and automatic manner, the shoulder portion of the spacer expander formed to have fine corrugations on a surface thereof that contacts the inner circumferential surface of the side rail.

Accordingly, the invention provides a method of machining a shoulder portion of a spacer expander constituting, in combination with a side rail, a compound steel oil ring assembly, characterized by bringing a machining tool, which is formed to have desired corrugations, into pressured contact with a surface of a shoulder portion of a spacer expander that comes into contact with an inner circumferential surface of a side rail, and transferring the fine corrugations of the machining tool to the surface of the shoulder portion.

Thus, according to the present invention, a machining tool formed to have desired corrugations, such as a mold having a corrugated machining surface or a machining roller the peripheral surface of which is formed to have corrugations, is brought into pressured contact with the surface of the spacer expander shoulder to be machined, and the corrugations of the machining tool are transferred to the surface of the expander shoulder portion by the pressured contacting motion of the mold or rotation of the machining roller synchronized to the motion of the spacer expander. This is performed during a process in which the shoulder of the spacer expander is molded by the molding stroke of a pressing mold from above and below or from one direction, during a process in which the shoulder portion is ground to a finish by a grinding roller the peripheral surface of which is smoothened, or after either of these processes is completed.

In order to prevent sliding between the shoulder of the spacer expander and the inner circumferential surface of the side rail, the inner circumferential surface of the side rail is provided with the corrugations. In such case, the inner circumferential surface of the side rail preferably is provided with fine corrugations extending in the inclined direction of the profile line of the spacer expander shoulder portion.

According to the invention, the corrugations on the inner circumferential surface of the side rail are formed to extend in the inclined direction of the profile line of the spacer expander shoulder portion. Consequently, the edge portion of the spacer expander shoulder is fitted between the corrugations on the inner circumferential surface of the side rail to prevent circumferential motion of the side rail relative to the spacer expander. Since relative rotational motion of the upper and lower side rails with respect to the spacer expander is prevented, the openings in the two side rails are prevented from overlapping during operation. As a result, wasteful consumption of lubricating oil is eliminated.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 11 shows part of the outer periphery of the front of a spacer expander machined according to the present invention;

FIG. 12 is a sectional view taken along line VI—VI of in FIG. 11;

FIG. 13 shows part of the outer periphery of the front of a spacer expander machined according to a prior-art method;

FIG. 14 is a sectional view taken along line VIII-VIII in FIG. 13;

FIG. 15 is a partial perspective view of a side rail diagrammatically illustrating the configuration of the corrugation lines on its inner circumferential surface; and FIGS. 16A and 16BB each show part of the surface of a side rail diagrammatically inner circumferential illustrating the configuration of the corrugation lines thereon.

DESCRIPTION OF THE PREFERRED EMBODIMENT

Figure 1:
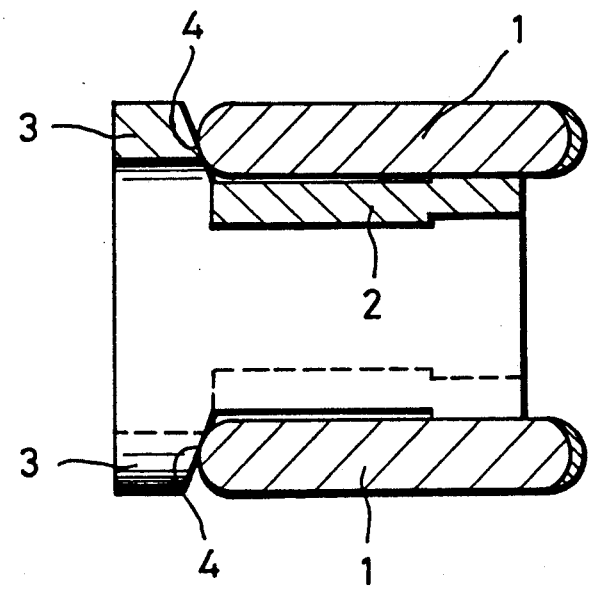
FIG. 1 is a sectional view illustrating a compound steel oil ring assembly.

An embodiment of the present invention illustrated in the drawings will now be described.

FIG. 1 illustrates a compound steel oil ring assembly having a spacer expander 2 and two side rails 1 disposed above and below the spacer expander 2. The spacer expander 2 has a shoulder 3 which is contacted by the inner circumferential surface of each side rail 1 at a contact point 4. Owing to the pressure applied to each side rail 1 by the corresponding shoulder 3 of the spacer expander 2, the side rails 1 are brought into contact with the inner wall of a cylinder of an internal combustion engine.

Figure 2:
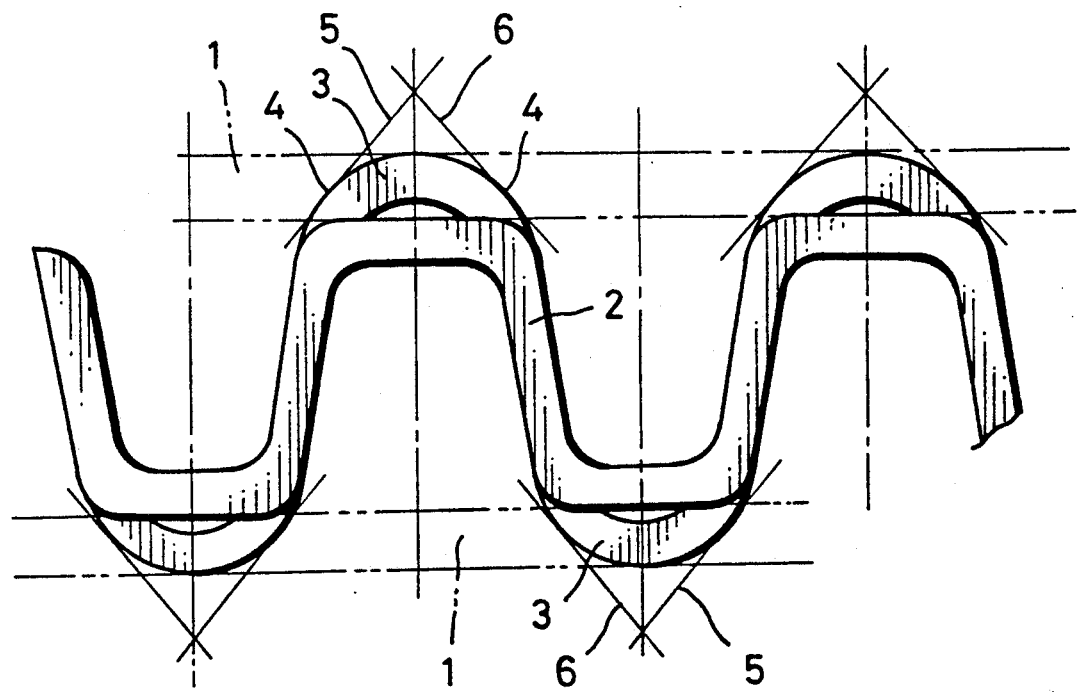
FIG. 2 is a partial front view of a spacer expander.

FIG. 2 is a front view of the spacer expander 2. The profile of the shoulder 3 of spacer expander 2 defines a circular arc. In FIG. 2, the side rails 1 are indicated by two-dot chain lines. It will be noted that each side rail 1 and shoulder portion 3 of the spacer expander contact at contact points 4, at which tangent lines 5, 6 extend with respect to the circular arc profile of the face of the shoulder portion 3 of the spacer expander 2.

Figure 3:
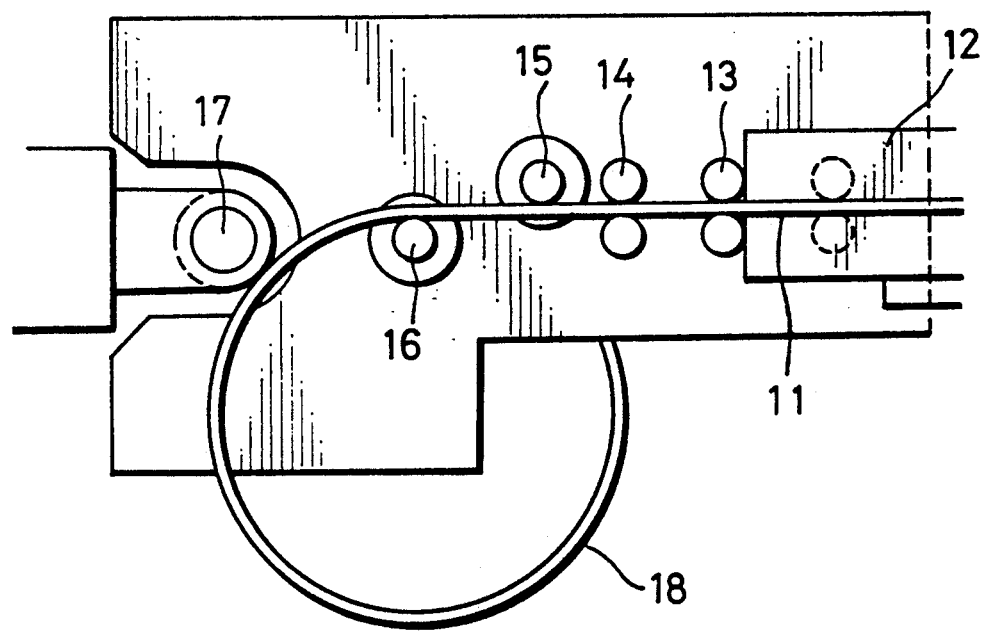
FIG. 3 shows the arrangement of pins in an apparatus for manufacturing the side rail of a compound steel oil ring assembly.

In FIG. 3, a fine, linear, strip shaped wire material 11 serving as the raw material of the side rails is fed out of a supply unit 12 and delivered by feed pin pairs 13, 14. The wire material 11 is bent while being passed between a plurality of pins, namely three pins 15, 16, 17 in the illustrated embodiment. An annular side rail 18 is thus manufactured.

Figure 4:
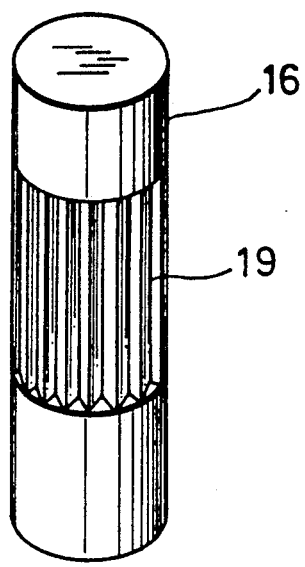
FIGS. 4 through 6 are perspective views illustrating modifications of the surface configuration of a pin.

The surface of at least one pin, e.g., the second pin 16, contacted by the inner circumferential surface of the annular side rail 18 has groove-shaped corrugations 19 in it extending in the axial direction, as shown in FIG. 4. When the wire material 11 is bent by the third pin 17 in FIG. 3 so as to become the annular side rail 18, the second pin 16 whose surface has the corrugations 19 strongly contacts the side of the wire material 11 that will become the inner circumferential surface of the side rail 18. As a result, the corrugations 19 of the second pin 16 are transferred to the inner circumferential surface of the side rail 18.

Figure 5:
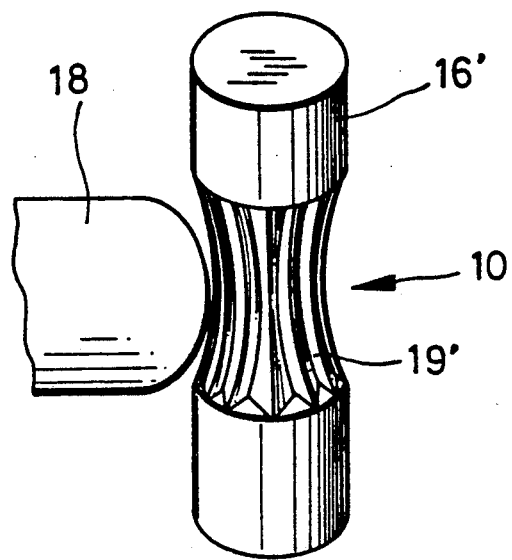

FIG. 5 illustrates a modification of the surface configuration of the second pin. Here the central portion of the second pin, designated by numeral 16', is formed to have a recess 10 matching the curved sectional shape of the inner circumferential surface of side rail 18. The recess 10 is formed to have groove-shaped corrugations 19' extending in the axial direction, similar to the corrugations 19 shown in FIG. 4.

Figure 6:
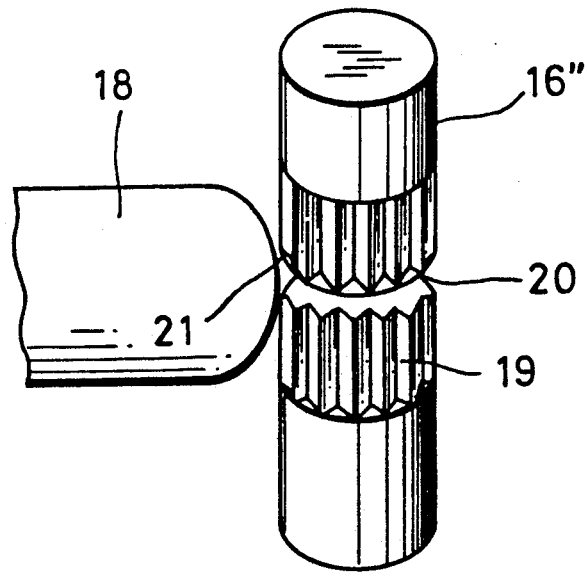

FIG. 6 shows a pin 16" obtained by forming an annular circumferential groove 20, which has a V-shaped section, across the central portion of the corrugations 19 of the second pin shown in FIG. 4. By bringing the wire material into pressured contact with the pin 16", a V-shaped projection 21 is formed on the central portion of the inner circumferential surface of side rail 18. As a result, corrugations are formed in the side rail 18 at positions spaced away from the apex of the inner circumferential surface, namely at positions where the side rail contacts the shoulders of the spacer expander.

Thus, according to the invention, corrugations are simply formed in the inner circumferential surface of the side rail of a compound steel oil ring assembly, thus making it possible to prevent sliding with respect to the spacer expander.

Figure 7:
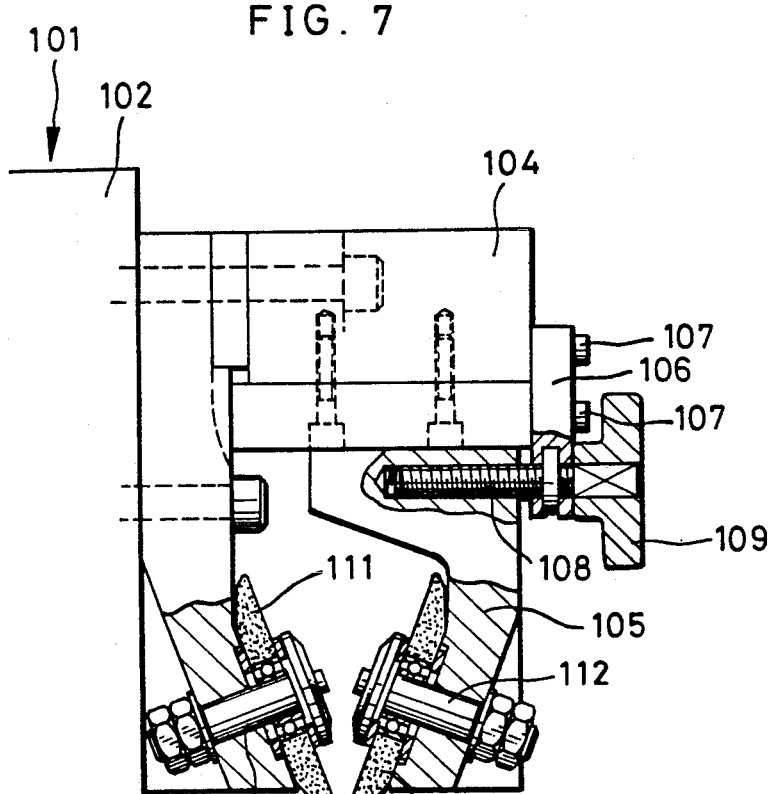
FIG. 7 is a front view showing an apparatus for machining the shoulder portion of a spacer expander.

FIG. 7 illustrates a method of forming corrugations on the shoulder portion of a spacer expander utilizing an apparatus 101, which is for machining the shoulder portion, proposed by the applicant in Japanese Utility Model application Laid-Open Nos. 1-78768 and 1-92364.

The machining apparatus 101 includes a drive shaft 103 rotatably supported on a casing 102, a fixed L-shaped bracket 104 secured to the casing 102, and a movable L-shaped bracket 105 supported on the fixed L-shaped bracket 104 so as to be slidable parallel to the axis of the drive shaft 103. The movable L-shaped bracket 105 is joined to the fixed L-shaped bracket 104 by a dovetail groove. A holder 106 is secured to the fixed bracket 104 by a bolt 107 and receives thrust generated when an adjustment knob 109 is turned to move the movable L-shaped bracket 105.

An adjustment screw 108 is supported on the holder 106 so as to be free to turn but not free to move axially. The adjustment knob 109 is detachably mounted on the adjustment screw 108. The latter is screwed into the movable L-shaped bracket 105. By turning the adjustment screw 108 using the adjustment knob 109, the movable L-shaped bracket 105 can be moved relative to the fixed L-shaped bracket 104 in the axial control direction of the drive shaft 103.

A first machining roller 111 serving as a machining tool is supported on the fixed L-shaped bracket 104 by a first support shaft 110, and a second machining roller 113 is supported on the movable L-shaped bracket 105 by a second support shaft 112.

Figure 8:
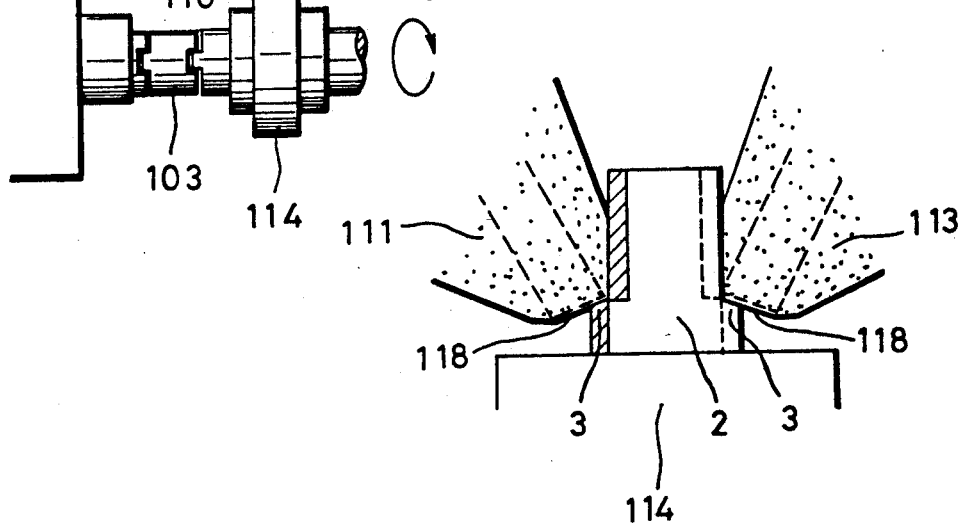
FIG. 8 is an enlarged partial sectional view of FIG. 7 illustrating the positional relationship between the spacer expander and the machining rollers at the time of machining.

A lower roller 114 is secured to the drive shaft 103, and the spacer expander 2 is set on the lower roller 114, as shown in FIG. 8.

Figure 9:
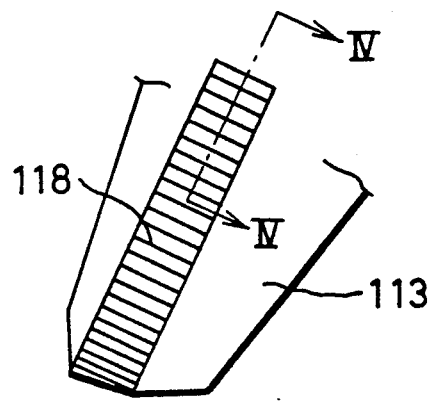
FIG. 9 shows part of a machining roller.
Figure 10:
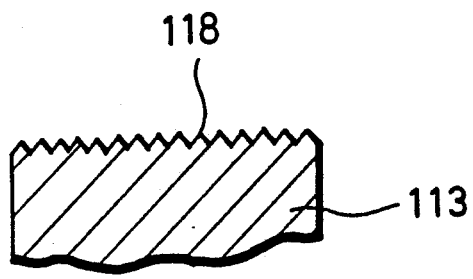
FIG. 10 is a sectional view taken along line IV—IV in FIG. 9.

The peripheral surface of the first machining roller 111 is brought into pressured contact with the left shoulder 3 (FIG. 8) of the spacer expander 2 that has been set on the lower roller 114, and the peripheral surface of the second machining roller 113 is brought into pressured contact with the right shoulder 3 of the spacer expander 2. At this time the spacer expander 2 is embraced at its side surfaces by the first machining roller 111 and second machining roller 113. The first and second machining rollers 111, 113 are mounted at angles of inclination set so that the peripheral surfaces of the rollers match the tapered surfaces of the shoulders 3, 3 of the spacer expander 2. The peripheral surfaces of the first and second machining rollers 111, 113 are formed to have a finely corrugated machining face 118, as shown in FIGS. 9 and 10.

The fixed L-shaped 104 is formed so as to be movable in order to adjust its position up or down with respect to casing 102. By moving the fixed L-shaped bracket 104 up or down and moving the movable L-shaped bracket 105 axially of drive shaft 103, the positions of the first and second machining rollers 111, 113 are adjusted relative to the spacer expander 2 so that the machining face 118 of first and second machining rollers 111, 113 is brought into accurate pressured contact with the shoulders 3, 3 of the spacer expander 2.

By rotating the drive shaft 103, the lower roller 114 is rotated to rotate or move the spacer expander 2. With motion of the spacer expander 2, the first and second rollers 111, 113 turn to transfer or roll the corrugations of the machining surface 118 onto the shoulder portions 3, 3.

FIGS. 11 and 12 illustrate the shoulder portions 3, 3 of the spacer expander 2 machined by the machining method of the present invention. The shoulder portions are formed to have fine corrugations 119, in comparison with smooth surfaces 120 of the shoulders 3, 3 of the spacer expander manufactured according to the prior art, ss shown in FIGS. 13 and 14.

Thus, with the machining method of the present invention, it is possible to readily form fine corrugations on the shoulders of a spacer expander without detracting from productivity. With the spacer expander machined in accordance with the invention, relative rotational movement between the side rails and the spacer expander is checked, excessive consumption of the lubricating oil is prevented as well as attendant atmospheric pollution. In addition, wear of the side rails on the inner circumferential surface thereof is prevented, and so is abnormal wear of the shoulder portions of the spacer expander.

FIG. 15 is a partial perspective view illustrating a side rail. Here the inner circumferential surface of side rail 1 is formed to having fine corrugations 5' and 6' extending in parallel to the tangent lines 5 and 6 of the profile of the shoulder portion 3 of spacer expander 2. (FIG. 2) Relative movement between the side rail 1 and the spacer expander 2 in the circumferential direction is checked since the corrugations 5' or 6' of side rail 1 abut against the end portion of shoulder 3 of the spacer expander 2.

FIG. 16(A) diagramatically shows part of a side rail as seen from an inner circumferential surface thereof. Here the corrugations lines 5' and 6' are formed parallel to the tangent lines 5, 6 of FIG. 2 and cross each other to form spaced X shaped configurations. As shown in FIG. 16(B), corrugations lines 5" and 6" of side rail 1 can be formed intermittenly so that they are only at the contact points 4 between the side rail 1 and the shoulder portion 3 of spacer expander 2 as shown in FIGS. 1 and 2. The corrugations 5", 6" provide effects similar to those of the corrugations 5',6'.

Thus, according to the present invention, movement of the side rail relative to the spacer expander in the circumferential direction can be checked in a reliable fashion. As a result, overlapping of the openings of upper and lower side rails is prevented, thereby making it possible to prevent wasteful consumption of lubricating oil.

What is claimed is:

1. In a compound steel oil ring assembly comprising a pair of annular side rails having an inner and outer circumferential surface and a spacer expander located between said rails for spacing the rails apart and having a plurality of spaced shoulders having a substantially flat axially and radially presented front face with a circular arc profile in plan view of the expander, the faces being in contact with the inner circumferential surface of the rails for urging the rails in a direction toward their outer circumferential surface, the improvement wherein the faces of the shoulders of the spacer expander in contact with the rails have a plurality of grooved-shaped corrugations in them and the inner circumferential surface of each side rail that contacts said face of the shoulders of said spacer expander has a plurality of groups of spaced, groove-shaped corrugation lines therein, the lines of each group being arranged to intersect each other and being alternately inclined at an angle parallel to lines tangent to the circular arc profile of the face of the shoulders.

2. The oil ring assembly of claim 1, wherein the spaced inclined corrugation lines are continuous to form a plurality of spaced X shaped configurations.

3. The oil ring assembly of claim 1, wherein the inner circumferential surface of the rails is rounded and the spaced inclined corrugation lines are intermittent and form a plurality of spaced X shaped configurations with a gap space in the area where they are intended to cross.

* * * * *